United States Patent [19]

Wilson

[11] Patent Number: 5,371,163
[45] Date of Patent: Dec. 6, 1994

[54] ORGANOSILOXANE COMPOSITIONS YIELDING TOUGH ELASTOMERIC MATERIALS

[75] Inventor: Steven W. Wilson, Midland, Mich.

[73] Assignee: Dow Corning Corporation, Midland, Mich.

[21] Appl. No.: 144,366

[22] Filed: Nov. 2, 1993

[51] Int. Cl.$^5$ .............................................. C08G 77/08
[52] U.S. Cl. ...................................... 528/15; 525/478
[58] Field of Search ........................... 528/15; 525/478

[56] References Cited

U.S. PATENT DOCUMENTS 4,340,709  7/1982  Jeram et al. ........................... 528/15
5,145,933  9/1992  Grisoni et al. ......................... 528/15

Primary Examiner—Melvyn I. Marquis
Attorney, Agent, or Firm—Robert Spector

[57] ABSTRACT

Tough gels and elastomers are prepared using compositions curable by a platinum catalyzed hydrosilation reaction that are characterized by the presence of a chain extender containing two silicon-bonded hydrogen atoms per molecule and a cross-linking agent containing at least three silicon bonded hydrogen atoms or alkenyl radicals per molecule, with the proviso that the chain extender contains at least 80 percent of the silicon bonded hydrogen atoms present in the composition or, when said cross-linking agent contains alkenyl radicals, said chain extender contains at least 80 percent of the total moles of silicon bonded hydrogen and said alkenyl radicals.

4 Claims, No Drawings

ORGANOSILOXANE COMPOSITIONS YIELDING TOUGH ELASTOMERIC MATERIALS

BACKGROUND OF THE INVENTION

1. Field of the Invention

This invention relates to curable organosiloxane compositions. More particularly, this invention relates to relatively low viscosity organosiloxane compositions that yield tough gels and elastomers upon curing.

2. Background Information

Elastomeric silicone materials, particularly those containing fillers such as finely divided forms of reinforcing silica and quartz, exhibit high levels of physical properties, including tensile strength, modulus and tear strength, that make these materials desirable in a variety of end use applications that utilize these properties.

Toughness is desirable for gels and elastomers that are used as coating, potting and encapsulating materials in electrical and electronic applications. Toughness can be defined as a combination of tensile strength, tear resistance and the ability to be elongated without ripping or tearing, which has been referred to as flexibility. This property is particularly desirable for materials that in order to function effectively must retain their integrity without cracking or crazing during repeated cycles of thermally induced expansion and contraction.

In many instances elastomer and gels used as coating, potting, and encapsulating materials must maintain adhesion to electronic and electrical components and printed circuit boards in addition to the electrical connectors and conductors that pass through the coating or encapsulating material. When the coating material expands, the connectors and conductors can act as initiation points for tears or cracks in the absence of sufficient toughness to dissipate the stresses occurring during expansion and contraction of the materials.

Organosiloxane elastomers and gels exhibiting sufficient toughness for electronic applications are typically prepared from compositions containing high molecular weight polyorganosiloxanes and/or high loadings of reinforcing fillers. The viscosity of these prior compositions is typically too high for use in coating and encapsulating intricately shaped substrates unless the compositions are diluted with solvents or vacuum assisted techniques such as vacuum impregnation are employed.

U.S. Pat. No. 5,145,933, which issued to Grisoni et al. on Sep. 8, 1992 describes organosiloxane gel forming compositions that cure by a platinum-catalyzed hydrosilation reaction. The curable compositions contain a polyorganosiloxane with vinyl radicals located only on non-terminal silicon atoms and two different types of organohydrogensiloxanes. One is a polydiorganosiloxane (1) containing silicon-bonded hydrogen atoms only at the terminal silicon atoms, and the second polyorganosiloxane (2) contains an average of at least three silicon-bonded hydrogen atoms per molecule, at least a portion of which are located on non-terminal silicon atoms. The percentage of the total silicon bonded hydrogen contributed by polyorganosiloxane (1) is equal to 81.36 minus a factor equal to 3.6 times the molar ratio of all silicon bonded hydrogen atoms in the curable composition, irrespective of source, to all of the alkenyl radicals present in the composition.

U.S. Pat. No. 4,340,709, issued on Jul. 20, 1982 to Jeram et al. relates to organosiloxane compositions that cure by a platinum-catalyzed hydrosilation reaction and contain the two types of organohydrogensiloxanes described in the Grisoni et al. patent. The molar ratio of the vinyl radicals present in the curable polyorganosiloxane to the silicon bonded hydrogen atoms present in the organohydrogensiiloxane (1), referred to by Jeram et al. as a hydride coupler, is from 0.75 to 1.5. While Jeram et al teach that the viscosity of the vinyl-terminated curable polyorganosiloxane can be from 100 to 200,000 centipoise (0.1 to 200 Pa.s) the lowest viscosity disclosed in the exemplified compositions (examples 2 and 3) is a mixture of 61.8 parts of a dimethylvinylsiloxy-terminated polydimethylsiloxane with a viscosity of 4,000 cps (4 Pa.s) and 5 parts of a dimethylvinylsiloxy-terminated polydimethylsiloxane with a viscosity of 0.5 Pa.s. In these compositions the hydride coupler contributes 70 and 74 percent, respectively, of the silicon-bonded hydrogen atoms present in the curable compositions, and the compositions contain a reinforcing silica filler. The curable compositions of example 2 and 3 had mixed viscosities of 40 and 85 Pa.s, respectively.

One objective of this invention is to provide curable organosiloxane compositions that are sufficiently low in viscosity to be applied to substrates in the absence of solvents or diluents using conventional coating and encapsulating techniques, yet which cure to yield tough elastomers and gels.

SUMMARY OF THE INVENTION

In accordance with the present invention, tough gels and elastomers are prepared using compositions curable by a platinum catalyzed hydrosilation reaction that are characterized by the presence of a chain extender containing two silicon-bonded hydrogen atoms per molecule and a cross-linking agent containing at least three silicon bonded hydrogen atoms or alkenyl radicals per molecule. The chain extender contains at least 80 percent of the silicon bonded hydrogen atoms present in the composition or, when said cross-linking agent contains alkenyl radicals, at least 80 percent of the total moles of silicon bonded hydrogen and said alkenyl radicals.

DETAILED DESCRIPTION OF THE INVENTION

This invention provides a curable organosiloxane composition comprising

A. a first liquid polyorganosiloxane comprising terminal siloxane units of the formula $R^1R_2^2SiO_{\frac{1}{2}}$ and non-terminal organosiloxane units of the formula $R_2^3SiO$, B. an amount sufficient to impart toughness to cured articles prepared from said composition of a chain extender selected from disiloxanes of the formula $(R^4HSi)_2O$ and liquid diorganohydrogensiloxy-terminated polydiorganosiloxanes wherein the terminal units are of the formula $HR_2^4SiO_{\frac{1}{2}}$, and the non-terminal organosiloxane units are of the formula $R_2^5SiO$ where $R^1$ represents an alkenyl radical, and $R^2$, $R^3$, $R^4$ and $R^5$ are individually selected from unsubstituted and substituted monovalent hydrocarbon radicals that are free of ethylenic unsaturation, C. an amount sufficient to cure said composition of a cross-linking agent comprising a second polyorganosiloxane containing an average of at least three silicon-bonded hydrogen atoms or alkenyl radicals per molecule and silicon-bonded where the remaining silicon-bonded organic groups are monovalent hydrocarbon radicals selected from the same group as R$^2$, and D. an amount of a hydrosilation catalyst sufficient to promote curing of said composition, wherein the number of silicon-bonded hydrogen atoms present in said chain extender constitute at least 80 percent of total lumber of silicon-bonded hydrogen atoms and alkenyl radicals present in the combination of said chain extender and said cross-linking agent, the molar ratio of silicon-bonded hydrogen atoms in said chain extender to alkenyl radicals present in said first polyorganosiloxane is from 0.8 to 1.2.

THE CHAIN EXTENDER (INGREDIENT B)

The inventive feature of tile present compositions is the relatively high percentage, typically greater than 80 percent, of the total silicon-bonded hydrogen atoms contributed by the tetraorganodihydridodisiloxane or the diorganohydrogensiloxy-terminated polydiorganosiloxane, also referred to as ingredient B. These compounds function as chain extenders for the substantially linear liquid polyorganosiloxane (ingredient A) that contains alkenyl radicals only at the terminal positions.

The chain extender reacts with the terminal alkenyl radicals of ingredient A, thereby linking two or more molecules of this ingredient together and increasing its effective molecular weight and the distance between potential cross-linking sites.

The high percentage of silicon-bonded hydrogen atoms present in the chain extender relative to the cross-linking agent of the present curable compositions is believed to account for the similarity in physical properties, particularly toughness, between cured elastomeric materials prepared from compositions containing the present relatively low viscosity alkenyl-terminated polyorganosiloxanes and low concentrations of reinforcing filers, and curable organosiloxane compositions of the type exemplified in the aforementioned patent to Jeram et al. These exemplified compositions exhibit viscosities of at least 40 Pa.s due to the presence of high viscosity polymers and/or high concentrations of reinforcing fillers.

The effect of the present chain extended polymers on the properties of the cured composition is similar to that of using a higher molecular weight polyorganosiloxane, but without the processing and other difficulties associated with high viscosity curable organosiloxane composition.

The present compositions typically have viscosities of from 0.1 Pa.s or less to 10 Pa.s When the chain extender is a disiloxane it is represented by the formula (R$_2^4$HSi)$_2$O. Polyorganosiloxanes used as chain extenders contain terminal units of the formula HR$_2^4$SiO$_{\frac{1}{2}}$ and non-terminal organosiloxane units of the formula R5$_2$SiO. In these formulae R$^4$ and R$^5$ represent unsubstituted or substituted monovalent hydrocarbon radicals that are free of ethylenic unsaturation. Hydrocarbon radicals that can be represented by R$^4$ and R$^5$ include but are not limited to alkyl containing from 1 to 10 or more carbon atoms, substituted alkyl such as chloromethyl and 3,3,3-trifluoropropyl, cycloalkyl radicals, aryl radicals containing 6 or more carbon atoms, alkaryl radicals such as tolyl and xylyl and aralkyl radicals such as benzyl.

Chain extenders suitable for use in the present compositions have viscosities of from about 0.001 to 1 Pa.s, preferably from 0.001 to 0.1 Pa.s to maximize the concentration of silicon bonded hydrogen atoms and minimize the viscosity of the curable composition.

The concentration of chain extender in the present compositions is typically inversely proportional to the molecular weight of the curable polydiorganosiloxane, ingredient A. For example, when ingredient A has a dimethylvinylsiloxy-terminated polydimethylsiloxane with a degree of polymerization of 150, equivalent to a vinyl content of 0.000171 mole of vinyl per gram, from 7 to 15 weight percent of chain extender will be required to achieve the desired molar ratio (0.8 to 1.1) silicon-bonded hydrogen atoms in the chain extender to vinyl radicals in ingredient A. This range should also comply with the requirement that the chain extender provide at least 80 percent of the total silicon bonded hydrogen atoms and alkenyl radicals present in the combination of chain extender and cross-linking reactant (ingredient C).

THE CROSSLINKING AGENT (INGREDIENT C)

The present compositions contain a cross-linking agent with at least three silicon-bonded hydrogen atoms or alkenyl radicals per molecule. In the presence of the hydrosilation catalyst, referred to as ingredient D, the silicon-bonded hydrogen atoms in ingredient C undergo all addition reaction, referred to as hydrosilation, with the silicon-bonded alkenyl groups in ingredient A, resulting in cross-linking and curing of the composition. When the cross-linking agent contains alkenyl radicals, it reacts with a portion of the silicon-bonded hydrogen atoms present on the chain extender.

The silicon-bonded organic groups present in ingredient C are selected from the same group of monovalent hydrocarbon and halogenated hydrocarbon radicals as the organic groups of ingredient A. The molecular structure of ingredient C can be straight chain, branch-containing straight chain, cyclic, or network. The siloxane units of the cross-linking agent can exhibit the formulae R$^6_a$SiO$_{4-a/2}$, where each R$^6$ is individually selected from monovalent unsubstituted or substituted hydrocarbon radicals selected from the same group as R$^4$ and a is 0, 1, 2 or 3. It should be understood that combinations of siloxane units containing different values of a can be present, and that one of the R$^6$ substituents represents hydrogen or alkenyl in at least 3 units of each molecule of cross-linking agent. Units wherein a is O can constitute up to about 50 mole percent of the units present in the curing agent.

While the molecular weight of ingredient C is not specifically restricted, viscosities in the range of 0.5 to 2 Pa.s at 25 degrees Centigrade are preferred.

The present inventors discovered that a variation of 50 percent or less from the optimum concentration of crosslinking agents containing silicon bonded hydrogen atoms results in a substantial change in properties, including toughness, of the cured gel or elastomer prepared from the curable composition.

The accompanying examples demonstrate that when using an organohydrogensiloxane as the curing agent, using a different batch of the same type of curable polydiorganosiloxane (ingredient A) with a slightly different concentration of vinyl radicals can substantially change the physical properties of the cured articles when operating close to the limits of the range for the molar ratio of silicon-bonded hydrogen atoms to vinyl radicals.

The concentrations of ingredients A, B and C required to optimize the desired combination of hardness and toughness can be determined by routine experimentation with a knowledge of the present invention.

When the curable composition contains less than 0.8 or more than 1.2 moles of silicon-bonded hydrogen atoms per mole of alkenyl radicals the composition cannot be satisfactorily cured.

The concentration of ingredient C is sufficient to provide the degree of crosslinking required to cure the organosiloxane composition. When ingredient C is a polyorganohydrogensiloxane, the molar ratio of the silicon-bonded hydrogen atoms contributed by this ingredient and the chain extender to the alkenyl radicals present in ingredient A is from 0.8 to 1.2.

A second type of cross-linking agent is a polyorganosiloxane containing more than two vinyl or other alkenyl radical per molecule. Because the alkenyl-containing polyorganosiloxanes are typically higher in molecular weight than organohydrogensiloxanes containing the same number of silicon-bonded hydrogen atoms per molecule, the advantage of using alkenyl-functional polyorganosiloxanes as cross-linking agents is the wider concentration range over which the required concentration range of alkenyl radicals can be achieved. The concentration of alkenyl radicals contributed by this the of cross-linking agent will affect the physical properties, particularly toughness, of cured materials prepared using the present compositions.

When the cross-linking agent contains alkenyl radicals instead of silicon bonded hydrogen atoms, the ratio of (a) the total moles of alkenyl radicals contributed by this ingredient and the silicon bonded hydrogen atoms contributed by the chain extender to (b) the moles of alkenyl radicals present in ingredient A is from 0.8 to 1.2.

Irrespective of whether the cross-linking agent contains silicon-bonded hydrogen atoms or alkenyl radicals, the chain extender provides at least 80 percent of the silicon-bonded hydrogen atoms and alkenyl radicals present in the combination of chain extender and cross-linking agent. The preferred range for this percentage will be determined at least in part by the filler content of the curable composition and the concentration of alkenyl radicals in ingredient A. When no filler is present, this percentage is preferably at least 85%.

The concentration of alkenyl-containing crosslinker required to achieve a composition of the present invention can be calculated using the desired molar ratio of silicon-bonded hydrogen atoms to alkenyl radicals present in ingredient A. In this instance the number of moles of alkenyl radicals contributed by the alkenyl-containing cross-linking agent is substituted for the number of moles of silicon-bonded hydrogen atoms contributed by the organohydrogensiloxane type of cross-linker.

For example, when the desired SiH to alkenyl ratio is 1.1, ratio of silicon-bonded hydrogen atoms in the chain extender to alkenyl radicals in ingredient A is 1.0, the concentration of alkenyl-containing cross-linking agent should be equivalent to 0.1 mole of alkenyl radicals in this cross-linking agent for each mole of alkenyl radicals present in ingredient A.

THE ALKENYL-CONTAINING POLYORGANOSILOXANE (INGREDIENT A)

The polyorganosiloxane referred to as ingredient A of the curable organosiloxane compositions of this invention is the principal ingredient of these compositions. This ingredient must contain at least two silicon-bonded alkenyl radicals in each molecule. Suitable alkenyl radicals contain from 1 to about 10 carbon atoms and are exemplified by but not limited to vinyl, allyl and 5-hexenyl. The silicon-bonded organic groups other than alkenyl radicals present in ingredient A are typically monovalent hydrocarbon and halogenated hydrocarbon radicals exemplified by but not limited to alkyl radicals such as methyl, ethyl and propyl; aryl radicals such as phenyl; and halogenated alkyl radicals such as 3,3,3-trifluoropropyl.

The molecular structure of ingredient A is typically linear, however there can be some branching due to the presence of trivalent siloxane units within the molecule. To achieve a useful level of tensile properties in the elastomers prepared by curing the present compositions, the molecular weight of this ingredient should be sufficient to achieve a viscosity at 25° C. greater than about 0.1 Pa.s. The restriction on the upper limit for the molecular weight of ingredient A is that the viscosity of the curable composition no exceed the range for the present curable compositions, which typically do not exceed about 10 Pa.s. One advantage of using the present chain extending agents is to reduce the viscosity of the curable compositions while desirable physical properties, particularly toughness, in the cured materials that are typically associated with using high molecular weight liquid or gum type polyorganosiloxanes as ingredient A. When the viscosity of ingredient A exceeds 10 Pa.s this advantage is no longer apparent.

Preferred embodiments of ingredient A are polydiorganosiloxanes represented by the general formula I

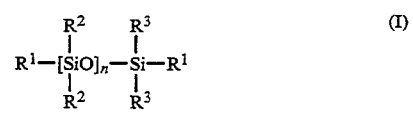

where each $R^1$ is a vinyl or other monovalent ethylenically unsaturated hydrocarbon radical, $R^2$ and $R^3$ do not contain ethylenic unsaturation and are individually selected from monovalent hydrocarbon radicals and monovalent halohydrocarbon radicals, and n represents a degree of polymerization equivalent to a viscosity of from 0.1 to 10 Pa.s.

The substituents represented by $R^2$ and $R^3$ in formula I can be identical or different, contain from 1 to about 20 carbon atoms and are free of ethylenic unsaturation. A range of from 1 to 10 carbon atoms is preferred based on the availability of the corresponding monomers. Most preferably at least one of the hydrocarbon radicals on each silicon atom is methyl, and any remainder are phenyl and/or 3,3,3-trifluoropropyl, this preference being based on the availability of the reactants typically used to prepare the polydiorganosiloxane and the properties of cured elastomers prepared from these polydiorganosiloxanes. For the same reasons, $R^1$ preferably contains from 2 to 10 carbon atoms and is most preferably vinyl or 5-hexenyl.

Representative embodiments of ingredient A containing ethylenically unsaturated hydrocarbon radicals only at the terminal positions include but are not limited to dimethylvinylsiloxy-terminated polydimethylsiloxanes, C, dimethylvinylsiloxy-terminated polymethyl-3,3,3-trifluoropropylsiloxanes, dimethylvinylsiloxy-terminated -dimethylsiloxane/3,3,3-trifluoropropylmethylsiloxane copolymers and dimethylvinylsiloxy-terminated-dimethylsiloxane/methylphenylsiloxane copolymers.

Methods for preparing ingredient A of the present compositions by hydrolysis and condensation of the corresponding halosilanes or by condensation of the cyclic polydiorganosiloxanes are sufficiently disclosed in the patent and other literature that a detailed description in this specification is not necessary.

THE PLATINUM-CONTAINING HYDROSILATION REACTION CATALYST (INGREDIENT D)

Curing of the present compositions is catalyzed by a hydrosilation catalyst that is a metal from the platinum group of the periodic table or a compound of such a metal. These metals include platinum, palladium and rhodium. Platinum and platinum compounds are preferred based on the high activity level of these catalysts in hydrosilation reactions.

Examples of preferred curing catalysts include but are not limited to platinum black, platinum metal on various solid supports, chloroplatinic acids, alcohol solutions of chloroplatinic acid, and complexes of chloroplatinic acid with liquid ethylenically unsaturated compounds such as olefins and organosiloxanes containing ethylenically unsaturated hydrocarbon radicals bonded to silicon. Complexes of chloroplatinic acid with the aforementioned organosiloxanes containing ethylenically unsaturated hydrocarbon radicals are described in U.S. Pat. No. 3,419,593, which issued to David N. Willing on Dec. 31, 1968. The relevant portions of this patent are incorporated herein by reference as a teaching of preferred catalysts.

The concentration of ingredient D in the present compositions is equilivalent to a platinum concentration of from 0.1 to 500 parts by weight of platinum metal, preferably from 1 to 50 parts by weight of platinum metal, per million parts (ppm), based oil the combined weight of ingredients A and B.

Curing does not proceed satisfactorily at below 0.1 ppm of platinum, while using more than 500 ppm results in no appreciable increase in cure rate, and is therefore uneconomical.

OPTIONAL INGREDIENTS

Platinum Catalyst Inhibitors

Mixtures of the aforementioned ingredients A, B, C and D may begin to cure at ambient temperature. To obtain a longer working time or "pot life", the activity of the catalyst under ambient conditions can be retarded or suppressed by addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol constitute a preferred class of inhibitors that will suppress the activity of a platinum-containing catalyst at 25° C. Compositions containing these catalysts typically require heating at temperatures of 70° C. or above to cure at a practical rate.

If it desired to increase the pot life of a curable composition under ambient conditions, this can be accomplished using an alkenyl substituted siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of Up to 500 or more moles of inhibitor per mole of platinum are required. The optimum concentration for a given inhibitor in a given composition can readily be determined by routine experimentation and does not constitute part of this invention.

Some compositions may begin to cure under ambient conditions even when an inhibitor is present. One way to ensure storage stability is to package the ingredients of the curable composition in two or more containers, with the hydrosilation catalyst and the organohydrogensiloxane in separate containers. The contents of the containers are combined when it is desired to cure the composition.

One-part organosiloxane compositions having excellent long-term storage stability at temperature of up to 50° C. or higher can be prepared by first microencapsulating the platinum-containing hydrosilation catalyst in a thermoplastic or thermosetting polymer. Curable organosiloxane compositions containing microencapsulated hydrosilation catalysts are described in U.S. Pat. No. 4,766,176, which issued on Aug. 23, 1988 and U.S. Pat. No. 5,017,654, which issued on May 21, 1991. The teaching of these patents relating to storage stable one-part organosiloxane compositions is incorporated herein by reference. Suitable encapsulants include but are not limited to organosilicon resins and organic resins derived from ethylenically unsaturated hydrocarbons and/or esters of ethylenically unsaturatedcarboxylic acids such as acrylic and methacrylic acids.

REINFORCING FILLERS

To achieve high levels of tear strength and other physical properties that characterize some types of cured elastomers that can be prepared using the compositions of this invention, it may be desirable to include a reinforcing filler such as finely divided silica. Silica and other reinforcing fillers are often treated with one of more of the known filler treating agents to prevent a phenomenon referred to as "creping" or "crepe hardening" during processing of the curable composition.

Finely divided forms of silica are preferred reinforcing fillers. Colloidal silicas are particularly preferred because of their relatively high surface area, which is typically at least 50 square meters per gram. Fillers having surface areas of at least 300 square meters per gram are preferred for use in the present method. Colloidal silicas can be of the precipitated or a fume type. Both types of silica are commercially available.

The amount of finely divided silica or other reinforcing filler used in the present compositions is at least in part determined by the physical properties desired in the cured elastomer. Liquid polyorganosiloxane compositions typically contain from about 10 to about 30 percent by weight of silica, based on the weight of polydiorganosiloxane. The amount of silica or other filler should not exceed the amount that increases the viscosity of the curable composition above about 10 Pa.s.

The filler treating agent can be any of the low molecular weight organosilicon compounds disclosed in the art as being suitable for preventing creping of organosiloxane compositions during processing. The treating agents are typically liquid hydroxyl terminated polydiorganosiloxanes containing an average of from 2 to about 20 repeating units per molecule, and organosilicon compounds such as hexaorganodisiloxanes and hexaorganodisilazanes that hydrolyze under the conditions used to treat the filler to form compounds with silicon-bonded hydroxyl groups. Preferably at least a portion of the silicon bonded hydrocarbon radicals present on the treating agent are identical to a majority of the hydrocarbon radicals present in ingredients A, B and C. A small amount of water can be added together with the silica treating agent(s) as a processing aid.

It is believed that the treating agents function by reacting with silicon-bonded hydroxyl groups present on the surface of the silica or other filler particles to reduce interaction between these particles.

When a silica filler is used, it is preferably treated in the presence of at least a portion of the other ingredients of the present compositions by blending these ingredients together until the filler is completely treated and uniformly dispersed to form a homogeneous material.

The ingredients that are present during treatment of the filler typically include the silica treating agents and at least a portion of the polydiorganosiloxane(s) referred to herein as ingredient A.

ADDITIONAL OPTIONAL INGREDIENTS

The present organosiloxane compositions can contain one or more additives that are conventionally present in curable compositions of this type to impart or enhance certain physical properties of the cured composition in addition to adhesion or to facilitate processing of the curable composition.

Typical additives include but are not limited to non-reinforcing fillers such as quartz, alumina, mica and calcium carbonate; pigments such as carbon black and titanium dioxide; dyes, flame retardants, and heat and-/or ultraviolet light stabilizers.

PREPARATION OF CURABLE COMPOSITIONS

The compositions of this invention can be prepared by combining all of ingredients at ambient temperature. Any of the mixing techniques and devices described in the prior art can be used for this purpose. The particular device used will be determined by the viscosity of the ingredients and the final curable composition. Suitable mixers include but are not limited to paddle type mixers and kneader type mixers.

Cooling of the ingredients during mixing may be desirable to avoid premature curing of the composition.

One advantage of the present compositions is the ability to obtain tough cured gels and elastomers from relatively low viscosity curable organosiloxane compositions. As discussed in a previous section of this specification, the toughness of cured materials prepared using the present compositions is typically associated with organosiloxane compositions exhibiting viscosities above the present range of 10 Pa.s.

Toughness is typically defined as a combination of relatively high values of tensile strength, tear strength and the ability to elongate without rupturing or tearing and return to the original dimensions upon release of tension. It will be understood that the quantitative values of tensile, tear strength and elongation that define toughness are relative, and will vary with the typical properties of the material being considered For example, the tensile strength, tear strength and elongation at break values for an unfilled organosiloxane gel will be substantially lower that the corresponding values for an elastomer containing a reinforcing or non-reinforcing filler.

Referring specifically to the present organosiloxane compositions, the values of tensile strength, tear strength and modulus for cured materials prepared using these compositions are comparable to the values measured for cured materials prepared using compositions of considerably higher viscosity, typically at least 50 Pa.s, without the processing and other disadvantages associated with high viscosity compositions. Compositions with viscosities higher than about 50 Pa.s typically require dilution or heating to achieve viscosities suitable for coating, encapsulating and potting materials.

EXAMPLES

The following examples demonstrate the unique combination of physical properties, particularly toughness, of cured gels and elastomers prepared using the present curable compositions, and should not be interpreted as limiting the scope of the invention defined in the accompanying claims. Unless otherwise specified all parts and percentages in the examples are by weight and viscosities were measured at 25° C.

EXAMPLE 1

This example demonstrates the tough gels that can be prepared using unfilled organosiloxane compositions containing the ratio of chain extender to organohydrogensiloxane cross-linker that characterizes the present curable composition, and the change in physical properties obtained by relatively small variations in the relative concentrations of chain extender and cross-linker.

The gels were prepared by blending the ingredients of the curable compositions to homogeneity and curing the resultant mixtures by heating them either at a temperature of 120° C. for 15 to 20 minutes or at a temperature of 105° C. for 30 minutes.

The ingredients of the curable composition were:

A—a dimethylvinylsiloxy-terminated polydimethylsiloxane with a viscosity of about 0.4 Pa.s at 25° C.;

B—as the chain extender, a dimethylhydrogensiloxy-terminated polydimethylsiloxane with a viscosity of 0.01 Pa.s and containing about 0.1 weight percent of silicon-bonded hydrogen;

C—as the cross-linking agent, a trimethylsiloxy-terminated polyorganosiloxane containing an average of five methylhydrogensiloxane units and three dimethylsiloxane units per molecule with a silicon-bonded hydrogen atom content in the range from about 0.7 to 0.8 weight percent;

D—as the curing catalyst, a reaction product of hexachloroplatinic acid and sym-tetramethyldivinyldisiloxane that has been diluted with a liquid dimethylvinylsiloxy terminated polydimethylsiloxane in an amount sufficient to achieve a platinum content of 0.7 weight percent; and E—as the curing catalyst inhibitors 3,5-dimethylhexyn-3-ol (E1) and/or cyclic methylvinylsiloxanes (E2).

For purposes of comparison a composition, identified as sample 3, was prepared containing too low a concentration of chain extender.

The amounts of ingredients present in the compositions evaluated and the type of cured product produced are summarized in Table 1. If the gel could be elongated at least 250 percent without rupturing or tearing and recovered its original shape following release of the force it was characterized as "tough"

The table also lists the SiH to vinyl molar ratios based on ingredients B and C and the percent of total silicon bonded hydrogen contributed by ingredient B (%SiH B).

TABLE 1

| Ingredient Pts. by Wt. | SAMPLE | | |
|---|---|---|---|
| | 1 | 2 | 3(C)* |
| A | 90 | 90 | 125 |
| B | 10 | 10 | 10 |
| C | 0.30 | 0.15 | 0.25 |
| D | 0.35 | 0.22 | 0.24 |
| E1 | 0.09 | 0.09 | 0.1 |
| E2 | 0.05 | 0.05 | 0 |
| SiH/Vinyl | | | |
| B | 1.0 | 1.0 | 0.76 |
| C | 0.15 | 0.075 | 0.09 |
| % SiH B | 87 | 93 | 89 |
| Cured | Tough | Tough | Soft |
| Gel | Not | Not | and |
| Properties | Tacky | Tacky | Sticky |

* = contained 0.1 part of phenyl butynol as a 50 weight percent solution in toluene as the catalyst inhibitor
C = Comparison Example

EXAMPLE 2

This example demonstrates the effect of the concentrations of the chain extender and cross-linker of Example 1 on the physical properties of cured articles prepared from the same reactants described in Example 1 with the addition of a quartz filler with an average particle size of 5 microns. The types and amounts of ingredients B and C and the toughness of the cured articles are recorded in Table 2. In addition to these ingredients the compositions contained 46.8 parts of ingredient A, as ingredient D, 0.2 part of the platinum-containing catalyst used in Example 1, 41.4 parts of quartz, 0.81 parts of zinc oxide and 0.45 parts of carbon black.

The materials characterized as tough could be elongated at least 250 percent without rupturing or tearing and recovered their original dimensions within 3 seconds following release of the force.

TABLE 2

| Ingredient Pts. by Wt. | SAMPLE | | | |
|---|---|---|---|---|
| | 1(C) | 2 | 3 | 4(C) |
| B | 5 | 5 | 4.58 | 4.37 |
| C | 0.15 | 0.19 | 0.17 | 0.19 |
| E1 | 0.045 | 0.45 | 0 | 0.29 |
| E2 | 0.02 | 0.03 | 0.04 | 0.06 |
| SiH/Vinyl | | | | |
| B | 1 | 1 | 0.90 | 0.88 |
| C | 0.15 | 0.18 | 0.16 | 0.19 |
| % SiH B | 87 | 85 | 85 | 82 |
| Cured | Soft | Tough | Tough | Very |
| Elastomer | Not | Durometer | Durometer | Soft |
| Properties | Tough | (Shore A) = 10 | (Shore A) = 13 | |

EXAMPLE 3

This example demonstrates the effect of filler concentration on the physical properties of elastomers prepared using the present compositions and the ratio of chain extending organohydrogensiloxane to cross-linking organohydrogensiloxane required to achieve these properties.

Curable compositions containing the same ingredients as the compositions described in example 2 were prepared and cured using the procedure described in Example 1. The two compositions contained 19.5 parts of ingredient A, as ingredient D, 0.1 part of the platinum-containing catalyst used in Example 1, 30 parts of quartz, 0.1 parts of zinc oxide and 0.5 parts of carbon black.

The amounts of cross-linker and chain extender used, the amounts of silicon-bonded hydrogen atoms contributed by these reactants and the properties of the cured elastomers are summarized in Table 3. The data for sample 3 in Table 2 are included for purposes of comparison.

TABLE 3

| Ingredient Pts. by Wt. | SAMPLE | | |
|---|---|---|---|
| | 1 | 2 | 3 (Table 2) |
| B | 1.7 | 2.12 | |
| C | 0.07 | 0.08 | |
| E1 | 0.01 | 0 | |
| E2 | 0 | 0.045 | |
| SiH/Vinyl | | | |
| B | 0.8 | 1.03 | 0.9 |
| C | 0.16 | 0.18 | 0.16 |
| % SiH B | 83 | 85 | 85 |
| Cured | Soft, | Hard, Tough | Tough |
| Elastomer | Tough | Durometer | Durometer |
| Properties | | (Shore A) = 35 | (Shore A) = 13 |

EXAMPLE 4

This example demonstrates the physical properties obtained by using a vinyl-substituted polyorganosiloxane as the cross-linking agent. The curable compositions contained 24.4 parts of the same dimethylvinylsiloxy-terminated polydimethylsiloxane used in the preceding examples, 21.6 parts of quartz with a particle size of 5 microns, 0.42 part of zinc oxide, 0.23 part of carbon black and 0.09 part of the same platinum-containing hydrosilation catalyst described in the preceding examples.

The chain extending reactant, was the same one used in the preceding examples and referred to as ingredient B. The cross-linking reactant, referred to as ingredient C', was a dimethylvinylsiloxy-terminated dimethylsiloxane/methylvinylsiloxane copolymer containing an average of 145 dimethylsiloxane and 3 methylvinylsiloxane units per molecule. The copolymer contained 0.0042 mole of vinyl radicals per gram. The catalyst inhibitors were a 50 weight percent solution of phenyl-butynol (E1) in toluene and 3,5-dimethylhexyn-3-ol (E2) The amounts of ingredients B,C', catalyst inhibitor, the molar ratio of vinyl radicals from the cross-linking reactant (C') and the subjective evaluations of the cured elastomers are summarized in Table 4.

TABLE 4

| Ingredient Pts. by Wt. | SAMPLE | | | | |
|---|---|---|---|---|---|
| | 1 | 2 | 3 | 4 | 5 |
| B | 3 | 3.1 | 2.9 | 3.2 | 3.6 |
| C' | 1 | 1.8 | 1.8 | 2.3 | 2.3 |
| E1 | 0.05 | 0 | 0 | 0 | 0 |
| E2 | 0 | 0.03 | 0.03 | 0.03 | 0.03 |
| SiH/Vinyl | | | | | |
| B | 1.3 | 1.4 | 1.2 | 1.4 | 1.6 |
| Vinyl$_{C'}$/Vinyl$_A$ | 0.11 | 0.17 | 0.22 | 0.20 | 0.18 |
| SiH$_B$/(SiH$_B$ + Vinyl$_{C'}$) | 0.92 | 0.89 | 0.85 | 0.88 | 0.90 |
| Cured Elastomer Properties | Tough, Good Tear Strength | Good Tear Strength & Soft | Tougher & Harder Than Sample 2 | Soft, Tough, Highest Elong. | Tough, Lowest Tear Strength |

That which is claimed is:
1. A curable organosiloxane composition comprising
A. a first liquid polyorganosiloxane comprising terminal siloxane units of the formula $R^1R^2_2SiO_{\frac{1}{2}}$ and non-terminal organosiloxane units of the formula $R_2^3SiO$, B. an amount sufficient to impart toughness to cured articles prepared from said composition of a chain extender selected from disiloxanes of the formula $(R^4HSi)_2O$ or liquid diorganohydrogensiloxy-terminated polyorganosiloxanes wherein the terminal units are of the formula $HR_2^4SiO_{\frac{1}{2}}$, and the non-terminal organosiloxane units are of tile formula $R_2^5SiO$ where $R^1$ represents an alkenyl radical, and $R^2$, $R^3$, $R^4$ and $R^5$ are individually selected from unsubstituted or substituted monovalent hydrocarbon radicals that are free of ethylenic unsaturation, C. an amount sufficient to cure said composition of a cross-linking agent comprising a second polyorganosiloxane containing all average of at least three silicon-bonded hydrogen atoms or alkenyl radicals per molecule, where the remaining silicon-bonded organic groups are monovalent hydrocarbon radicals selected from the same group as $R^2$, and D. an amount of a hydrosilation catalyst sufficient to promote curing of said composition, wherein the number of silicon-bonded hydrogen atoms present in said chain extender constitute at least 80 percent of total number of silicon-bonded hydrogen atoms and alkenyl radicals present in the combination of said chain extender and said cross-linking agent, the molar ratio of silicon-bonded hydrogen atoms in said chain extender to alkenyl radicals present in said first polyorganosiloxane is from 0.8 to 1.2.

2. A composition according to claim 1 where the viscosity of said first polyorganosiloxane and said composition are from 0.1 to 10 Pa.s, said chain extender is a liquid diorganohydrogensiloxy-terminated polyorganosiloxane, $R^4$ and $R^5$ are selected from the group consisting of alkyl radicals containing from 1 to 10 carbon atoms, phenyl and 3,3,3-trifluoropropyl, $R^1$ contains from 2 to 10 carbon atoms, $R^2$ and $R^3$ contain 1 to 10 carbon atoms, the siloxane units of said cross-linking agent are represented by the formula $R^6_aSiO_{(4-a)/2}$ where $R^6$ is hydrogen or an unsubstituted or substituted monovalent hydrocarbon radical, with the proviso that $R^6$ represents hydrogen or an alkenyl radical on at least three of said units per molecule, a is 0, 1, 2 or 3 and the viscosity of said cross-linker is from 0.5 to 2 Pa.s at 25° C., and said hydrosilation catalyst is a metal from the platinum group of the periodic table or a compound of said metal.

3. A composition according to claim 2 where
each $R^1$ is vinyl or 5-hexenyl,
$R^2$ is methyl,
one of the two $R^3$ radicals on each silicon is methyl and the second is methyl, phenyl or 3,3,3-trifluoropropyl,
each $R^6$ is individually selected from the group consisting of hydrogen, vinyl, 5-hexenyl and methyl,
the viscosity of said chain extender is from 0,001 to 0.1 Pa.s, and
said catalyst is a platinum compound.

4. A composition according to claim 2 where said composition contains a filler selected from reinforcing silica or quartz and said chain extender contains at least 85 percent of the silicon-bonded hydrogen atoms present in said composition.

* * * * *